(12) United States Patent
Nakanishi et al.

(10) Patent No.: US 7,454,575 B2
(45) Date of Patent: Nov. 18, 2008

(54) CACHE MEMORY AND ITS CONTROLLING METHOD

(75) Inventors: Ryuta Nakanishi, Kyoto (JP); Hazuki Okabayashi, Osaka (JP); Tetsuya Tanaka, Kyoto (JP); Shuji Miyasaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 160 days.

(21) Appl. No.: 10/583,773

(22) PCT Filed: Dec. 21, 2004

(86) PCT No.: PCT/JP2004/019102

§ 371 (c)(1),
(2), (4) Date: Jun. 21, 2006

(87) PCT Pub. No.: WO2005/066796

PCT Pub. Date: Jul. 21, 2005

(65) Prior Publication Data

US 2007/0143548 A1    Jun. 21, 2007

(30) Foreign Application Priority Data

Dec. 22, 2003   (JP)   ............................ 2003-424042

(51) Int. Cl.
*G06F 12/00* (2006.01)
(52) U.S. Cl. ..................................... 711/141
(58) Field of Classification Search ................ 711/141, 711/144, 145
See application file for complete search history.

(56) References Cited

U.S. PATENT DOCUMENTS

| 4,928,239 | A  | * | 5/1990 | Baum et al. ................. 711/136 |
| 6,205,521 | B1 |   | 3/2001 | Schumann |
| 7,065,613 | B1 | * | 6/2006 | Flake et al. ................. 711/132 |
| 7,203,798 | B2 | * | 4/2007 | Kawamoto ................... 711/123 |

FOREIGN PATENT DOCUMENTS

| EP | 0997821   | 5/2000 |
| JP | 3-054649  | 3/1991 |
| JP | 7-084879  | 3/1995 |
| JP | 8-069417  | 3/1996 |

(Continued)

OTHER PUBLICATIONS

English language Abstract of JP 2003-223360.

(Continued)

*Primary Examiner*—Kevin Ellis
(74) *Attorney, Agent, or Firm*—Greenblum & Bernstein, P.L.C.

(57) ABSTRACT

The cache memory in the present invention is a cache entry having, in a correspondence with a cache entry which holds a data unit of caching, a valid flag indicating whether or not the cache entry is valid, and a dirty flag indicating whether or not the cache entry has been written into. The cache memory in the present invention includes an altering unit which, based on an instruction from a processor, sets, in the cache entry, an address serving as a tag and sets the valid flag, without loading data from a memory, or resets the dirty flag in a state in which the cache entry holds rewritten data that has not been written back.

11 Claims, 18 Drawing Sheets

FOREIGN PATENT DOCUMENTS

| | | |
|---|---|---|
| JP | 2000-029788 | 1/2000 |
| JP | 2000-200221 | 7/2000 |
| JP | 2001-222467 | 8/2001 |
| JP | 2003-223360 | 8/2003 |

OTHER PUBLICATIONS

English language Abstract of JP 2000-029788.
English language Abstract of JP 2001-222467.
English language Abstract of JP 3-054649.
English language Abstract of JP 7-084879.
English language Abstract of JP 8-069417.
English language Abstract of JP 2000-200221.
U.S. Appl. No. 10/571,531 to Tanaka et al., filed Mar. 10, 2006.
U.S. Appl. No. 10/577,133 to Okabayashi et al., filed Apr. 10, 2006.
U.S. Appl. No. 10/578,314 to Tanaka et al., filed May 4, 2006.
U.S. Appl. No. 10/578,299 to Okabayashi et al., filed May 4, 2006.

* cited by examiner

FIG. 6
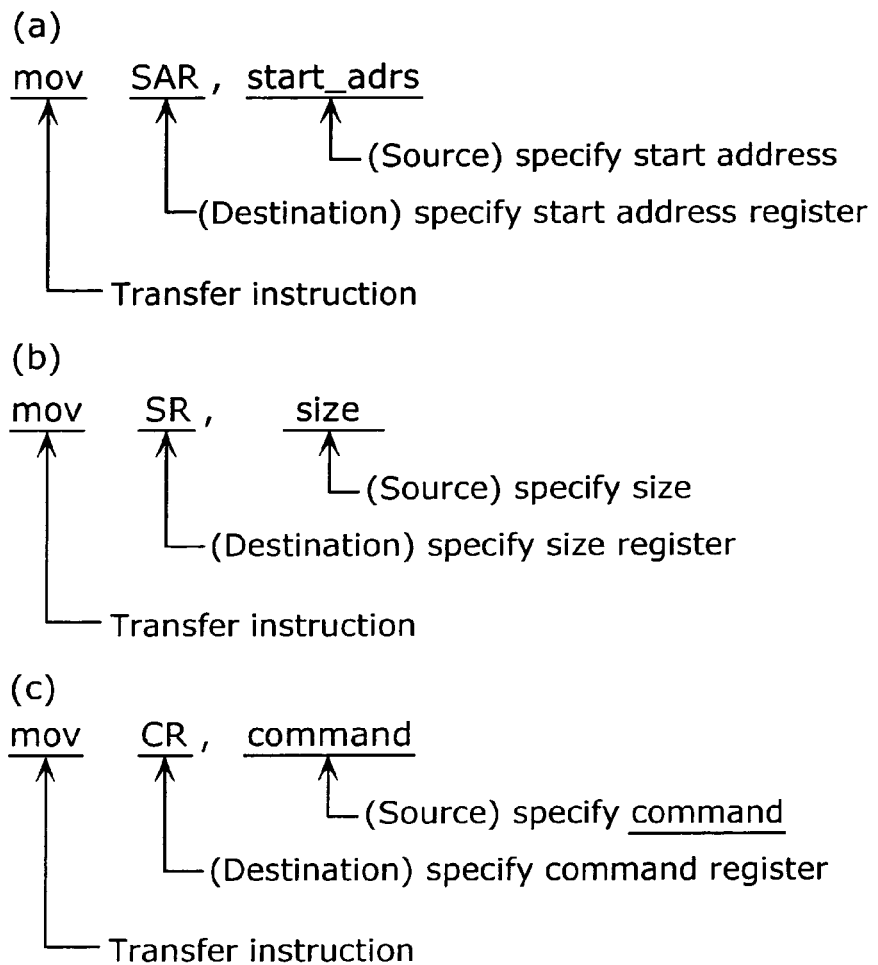
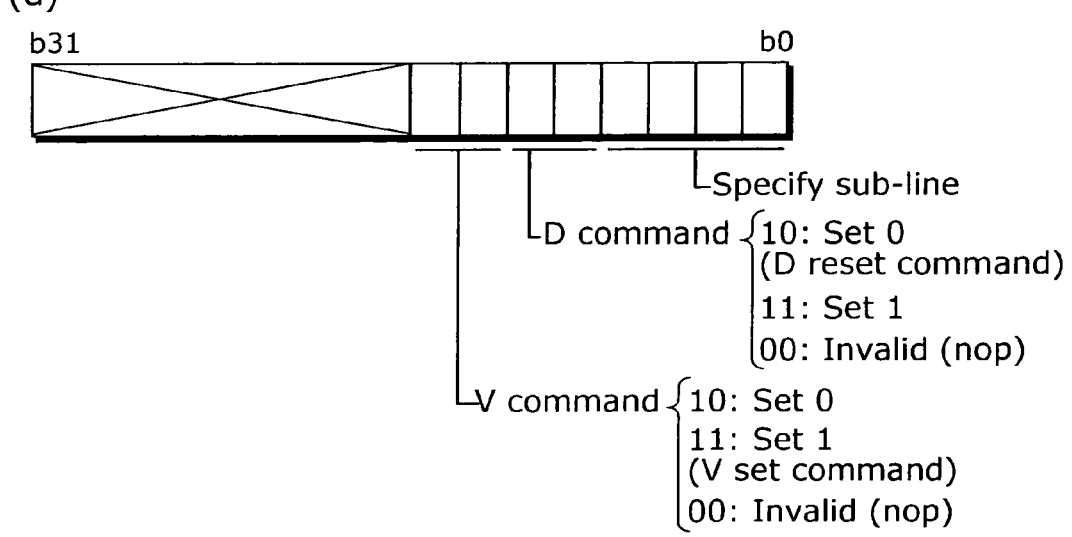

FIG. 13
(a)
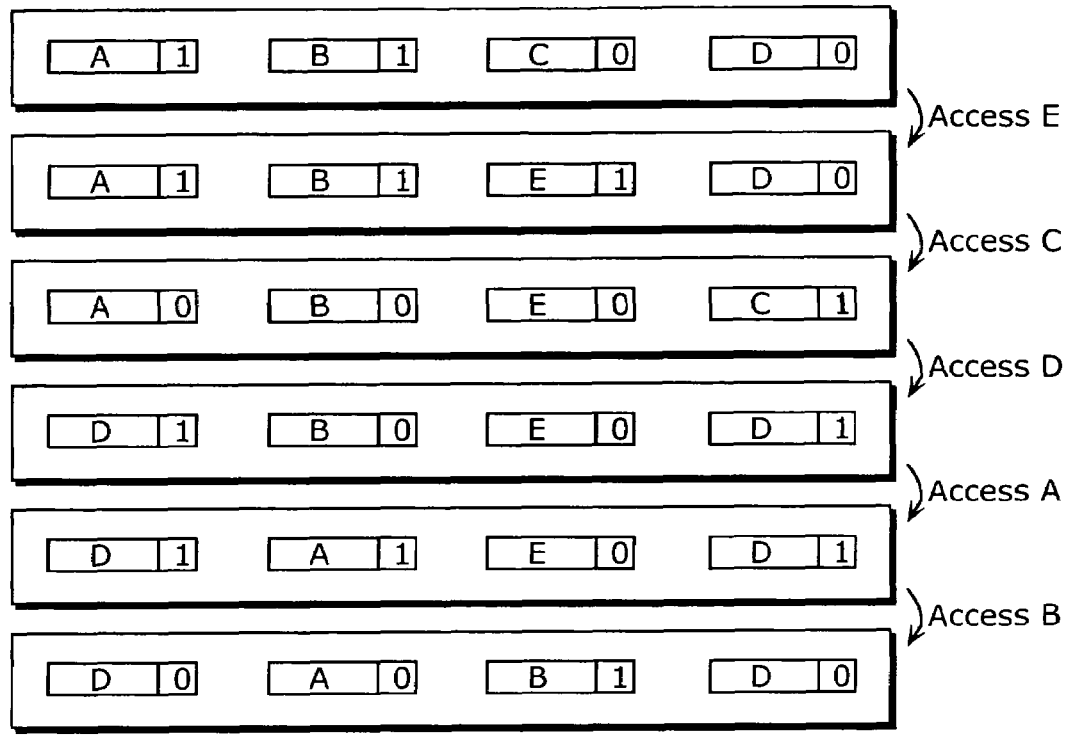
(b)
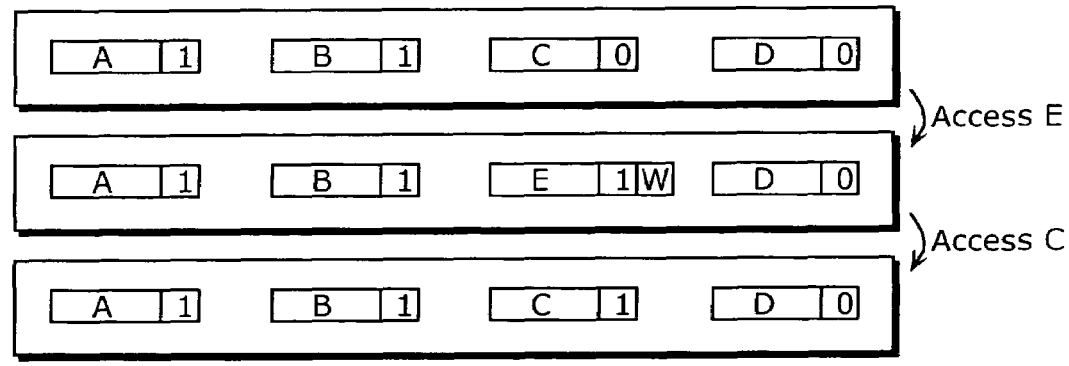

CACHE MEMORY AND ITS CONTROLLING METHOD

TECHNICAL FIELD

The present invention relates to a cache memory and a control method thereof, for facilitating high-speed memory access from a processor.

BACKGROUND ART

In recent microprocessors, high-speed memory access from a microprocessor is facilitated by placing a low capacity, high-speed cache memory, which is configured from an SRAM (Static Random Access Memory) for example, inside or near the microprocessor, and storing a part of data in the cache memory.

In a computer system, in the case where a mishit occurs in a read access or write access, from a central processing unit to the cache memory, a part of data that is newly read from a main memory is stored, as an entry (a registered item), in an empty block of the cache memory. At this time, when no block is empty, it becomes necessary to carry out an entry replacement process in which any one from among plural blocks is selected, and the entry stored in the selected block is returned to the main memory so as to empty such block, then the newly read data is stored into the emptied block. In the aforementioned entry replacement process, a method which selects a block storing data least recently referred to, in other words an LRU (Least Recently Used) decoding scheme, is generally adopted. With this LRU decoding scheme, the utilization efficiency of the cache memory improves and, as a result, the execution speed of the microprocessor improves.

Among programs processed by the microprocessor, there are special processes which are accessed infrequently but require high-speed processing once initiated, and there are processes which are accessed frequently but do not require much execution speed.

In response to this, for example, the cache memory is provided with a freeze function in the conventional technology such as in Patent Reference 1. The freeze function is a function which copies, beforehand, into the cache memory, a program which is accessed infrequently but requires high-speed processing once initiated, and which prohibits the rewriting of such area. By having this function, a computer system can, when necessary, read a program from the cache memory then execute it, thereby reducing execution time. Furthermore, a purge function is a function which does not store, into the cache memory, data or a program which are accessed frequently but do not require much execution speed so as to release such area. By having this function, an allowance is created in the cache memory and other programs and data having higher priority can be loaded into the cache memory, thereby improving the utilization efficiency of the cache memory and reducing overall execution time.

Patent Reference 1: Japanese Laid-Open Patent Application No. 2000-200221 Publication

DISCLOSURE OF INVENTION

PROBLEMS THAT INVENTION IS TO SOLVE

However, even when the freeze function and the purge function are used, there is still the problem that there are cases where, due to the occurrence of a cache miss, unnecessary replacement and unnecessary write back operations are performed.

For example, as a case in which unnecessary replacement takes place, there are instances where the processor writes back all array components. In such a case, even when data from the memory is newly replaced into the cache memory, such replacement is made unnecessary since the processor overwrites all the entries.

Furthermore, as a case in which an unnecessary write back takes place, there are instances where a cache entry is used simply as work data. In this case, an unnecessary write back takes place even though the data will eventually be discarded.

MEANS TO SOLVE THE PROBLEMS

The object of the present invention is to provide a cache memory that prevents unnecessary replacement and unnecessary write back operations.

In order to solve the aforementioned problem, the cache memory in the present invention is a cache memory comprising: a flag holding unit which holds, in a correspondence with a cache entry which holds a data unit of caching, a valid flag indicating whether or not the cache entry is valid, and a dirty flag indicating whether or not the cache entry has been written into; a command holding unit which holds a command issued by a processor; and an altering unit which alters, based on a command held by said command holding unit, at least one of the valid flag and the dirty flag, contrary to the state of the cache entry.

It is also possible to have a structure in which said altering unit sets, in the cache entry, an address serving as a tag, and sets the valid flag, without loading data from a memory.

According to this structure, a cache entry for the writing of data such as an array can be reserved in the cache memory, and it is possible to prevent data, which is destined to be written-over, from being unnecessarily loaded from the memory to the cache memory.

Furthermore, said altering unit resets the dirty flag of the cache entry in a state in which the cache entry holds rewritten data that has not been written back.

According to this structure, it is possible to prevent an unnecessary write back from a cache entry holding data destined to be discarded, such as temporary work data.

Here, it is also possible to have a structure in which the cache memory, further includes: a holding unit which holds an address range specified by the processor; and an identification unit which identifies a cache entry which holds data belonging to the held address range. The altering unit alters at least one of the valid flag and the dirty flag of the identified cache entry.

According to this structure, unnecessary loading of data to the cache memory or unnecessary write back to the memory can be prevented in the address range specified by the processor.

Here, it is also possible to have a structure in which said identification unit includes: a first conversion unit which, in the case where a start address of the address range indicates a point midway through line data, converts the start address into a start line address indicating a start line included in the address range; a second conversion unit which, in the case where an end address of the address range indicates a point midway through the line data, converts the end address into an end line address indicating an end line included in the address range; and a judgment unit which judges whether or not there exist cache entries which hold data corresponding to respective line addresses from the start line address to the end line address.

According to this process, the processor can specify, from arbitrary addresses, an arbitrary address (or an arbitrary size)

as the start address, regardless of the line size of the cache memory and the line boundary addresses. In other words, since the line size of the cache memory and the line boundary addresses do not need to be managed in the processor, the load for managing the cache memory can be eliminated.

Here, it is also possible to have a structure in which said altering unit further includes: an instruction detection unit which detects execution of a memory access instruction having a dirty flag reset directive; and a flag rewriting unit which resets a dirty flag of a cache entry which is accessed according to the instruction.

Here, it is also possible to have a structure in which said altering unit further includes: an instruction detection unit which detects execution of a memory access instruction having a valid flag reset directive; and a flag rewriting unit which resets a valid flag of a cache entry which is accessed according to the instruction.

Furthermore, the method for controlling a cache memory in the present invention has the same means and functions.

According to the cache memory in the present invention, a cache entry for the writing of data such as an array can be reserved in the cache memory, and it is possible to prevent data, which is destined to be written-over, from being unnecessarily loaded from the memory to the cache memory.

Furthermore, it is possible to prevent an unnecessary write back from a cache entry holding data destined to be discarded such as temporary work data.

In addition, the processor can specify, from arbitrary addresses, an arbitrary address (or an arbitrary size) as the start address, regardless of the line size of the cache memory and the line boundary addresses. In other words, since the line size of the cache memory and the line boundary addresses do not need to be managed in the processor, the load for managing the cache entry can be eliminated.

EFFECTS OF THE INVENTION

According to the cache memory in the present invention, a cache entry for the writing of data such as an array can be reserved in the cache memory, and it is possible to prevent data, which is destined to be written-over, from being unnecessarily loaded from the memory to the cache memory. Furthermore, it is possible to prevent an unnecessary write back from a cache entry holding data which is destined to be discarded such as temporary work data.

BRIEF DESCRIPTION OF DRAWINGS

FIG. 6(a) shows an example of an instruction for writing a start address into the start address register. FIG. 6(b) shows an example of an instruction for writing a size into the size register. FIG. 6(c) an example of an instruction for writing a command into the command register. FIG. 6(d) shows an example of a command.

FIG. 13(a) is a diagram showing the replacement of cache entries in the case where a weak flag does not exist. FIG. 13(b) is an explanatory diagram showing the role of the weak flag W in the replacement process.

NUMERICAL REFERENCES

Figure 1:
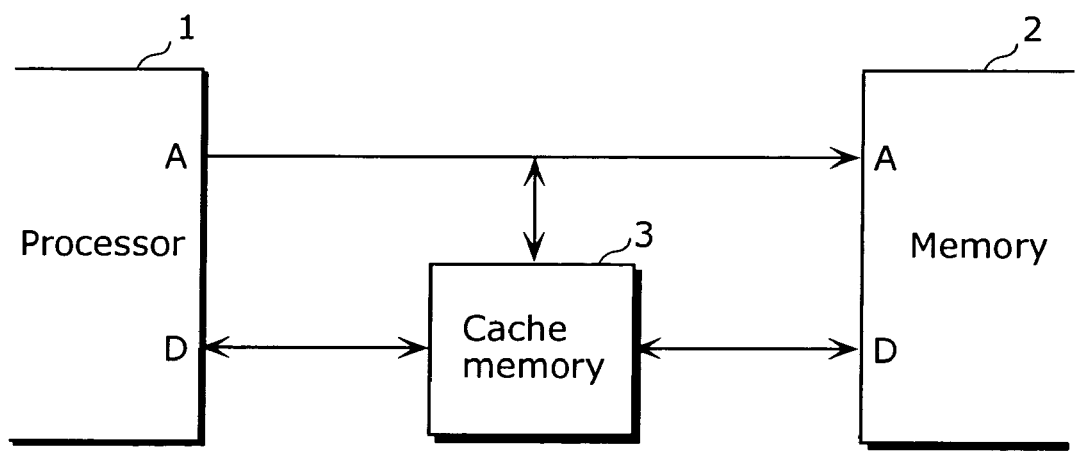
FIG. 1 is a block diagram showing the outline structure of the system including the processor, cache memory, and memory, in the first embodiment of the present invention.

1 Processor
2 Memory
3 Cache memory
20 Address register
21 Memory I/F
30 Decoder
31a to 31d Ways
32a to 32d Comparators
33a to 33d AND circuits
34 OR circuit
35 Selector
36 Selector
37 Demultiplexor
38 Control unit
39 Flag updating unit
40 Replacement unit
41 Flag altering unit
131a to 131d Ways
138 Control unit
139 Flag updating unit
140 Replacement unit
141 Flag altering unit
401 Command register
402 Start address register
403 Size register
404 Adding unit
405a Start aligner
405b Start aligner
406a End aligner
406b End aligner
407 Flag rewriting unit
407a Flag rewriting unit

BEST MODE FOR CARRYING OUT THE INVENTION

First Embodiment

<Overall Structure>

FIG. 1 is a block diagram showing the outline structure of a system including a processor 1, a cache memory 3, and a memory 2 in the first embodiment of the present invention. As shown in the diagram, the cache memory 3 in the present invention is included in a system having the processor 1 and the memory 2.

The cache memory 3 has, for each cache entry, a valid flag V indicating whether or not the cache entry is valid, and a dirty flag D indicating whether or not the cache entry has been written into. The cache memory 3 is configured so as to: alter, from 1 to 0 (not dirty), a dirty flag D of a cache entry holding data of an address specified by the processor 1, without writing back the data; and allocate a cache entry corresponding to an address specified by the processor 1 and alter its valid flag V to 1 (valid) without loading data from the memory.

The dirty flag D is altered from 1 to 0 in order to prevent an unnecessary write back from a cache entry holding temporary work data which will eventually be discarded. A cache entry is allocated and its valid flag V is altered to 1 (valid) without loading data from the memory in order to previously reserve the cache entry for the writing of an array and the like.

<Structure of the Cache Memory>

Hereinafter, the structure in the case where the present invention is applied to a 4-way set-associative cache memory shall be described as a specific example of the cache memory 3.

Figure 2:
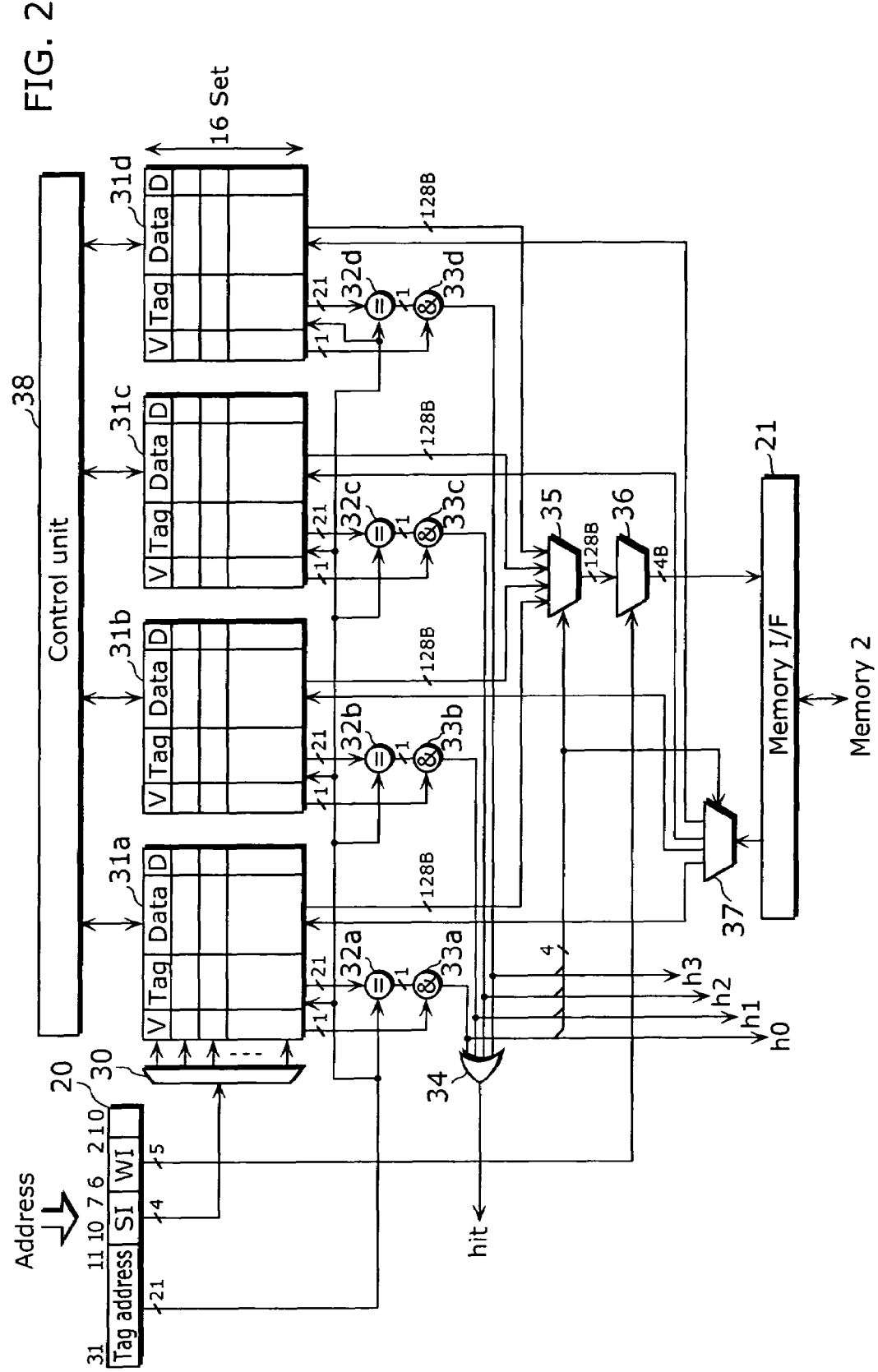
FIG. 2 is a block diagram showing an example of the structure of the cache memory.

FIG. 2 is a block diagram showing an example of the structure of the cache memory 3. As in the diagram, the cache memory 3 includes an address register 20, a memory I/F 21, a decoder 30, four ways 31a to 31d (hereinafter abbreviated as ways 0 to 3), four comparators 32a to 32d, four AND circuits 33a to 33d, an OR circuit 34, selectors 35 and 36, a demultiplexor 37, and a control unit 38.

The address register 20 is a register which holds an access address to the memory 2. Such access address is assumed to be of 32 bits. As shown in the same diagram, the access address includes, in order from the highest bit, a 21-bit tag address, a 4-bit set index (SI in the diagram), and a 5-bit word index (WI in the diagram). Here, the tag address indicates an area (with size being, the number of sets multiplied by a block) within the memory which is mapped by a way. The size of this area is the size defined by address bits (A10 to A0) which are lower than the tag address, in other words, 2 k bytes, and is also the size of one way. The set index (SI) indicates one of a plurality of sets which straddle the ways 0 to 3. As the set index is 4 bits, the number of sets is sixteen sets. A cache entry which is identified by the tag address and the set index is the unit for replacement, and is referred to as line data or a line when stored in the cache memory. The size of line data is the size defined by the address bits lower than the set index, in other words, 128 bytes. With one word being 4 bytes, one line data is 32 bytes. The word index (WI) indicates one word within plural words making up the line data. The lowest 2 bits (A1, A0) within the address register 20 are disregarded during word accessing.

The memory I/F 21 is an I/F for accessing the memory 2 from the cache memory 3 such as in writing back data from the cache memory 3 to the memory 2, and loading data from the memory 2 to the cache memory 3.

The decoder 30 decodes the 4 bits of the set index, and selects one set among the sixteen sets spanning the four ways 0 to 3.

The four ways 0 to 3 are four ways having the same structure and a capacity of 4×2 k bytes. Each way includes sixteen cache entries.

Figure 3:
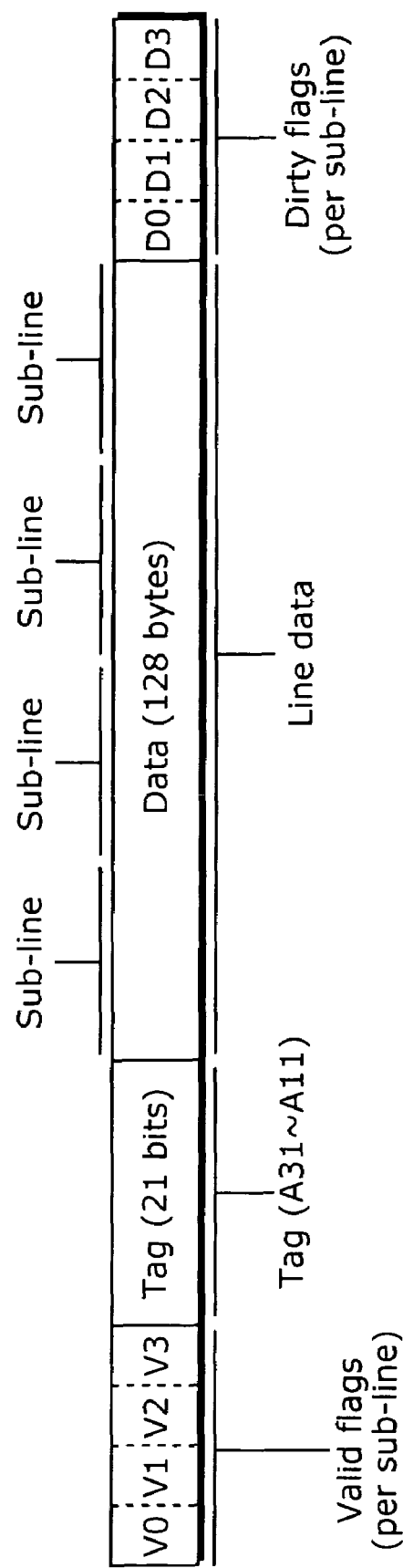
FIG. 3 is a diagram showing the detailed bit structure of a cache entry.

FIG. 3 shows the detailed bit structure of a single cache entry. As in the diagram, a cache entry has valid flags V0 to V3, a 21-bit tag, a 128-byte line data, and dirty flags D0 to D3.

The tag is a copy of a 21-bit tag address.

The line data is a copy of 128-byte data within a block identified by the tag address and the set index, and is made up of four 32-byte sub-lines.

The valid flags V0 to V3 correspond to the four sub-lines, and indicates whether or not a respective sub-line is valid.

The dirty flags D0 to D3 correspond to the four sub-lines, and indicate whether or not a respective sub-line has been written into by the processor, in other words, whether or not a write back is necessary as, although cached data exists within a sub-line, such data is different from the data within the memory as a result of the write operation.

The comparator 32a compares whether or not the tag address within the address register 20 matches the tag of the way 0 among the four tags included in the set selected according to the set index. Aside from corresponding to the ways 31b to 31d respectively, everything else is the same for the comparators 32b to 32d.

The AND circuit 33a compares whether or not the valid flag matches the comparison result from the comparator 32a. The result of this comparison shall be assumed to be h0. In the case where the comparison result h0 is 1, this means that there exists line data corresponding to the tag address within the address register 20 and the set index, in other words, a hit has occurred in the way 0. In the case where the comparison result h0 is 0, this means that a mishit has occurred. Aside from corresponding to the ways 31b to 31d respectively, everything else is the same for the AND circuits 33b to 33d. Respective comparison results h1 to h3 represent a hit or miss occurring in the ways 1 to 3.

The OR circuit 34 carries out the OR for the comparison results h0 to h3. The result of this OR is assumed as a hit. A hit indicates whether or not a hit occurs in the cache memory.

The selector 35 selects, among the line data of the ways 0 to 3 in the selected set, the line data of the way in which a hit occurs.

The selector 36 selects, from within the 32-word line data selected by the selector 35, one word which is indicated by the word index.

The demultiplexor 37 outputs write data to one of the ways 0 to 3, during the writing of data into the cache entry. The write data may be in 1-word units.

The control unit 38 performs the overall control of the cache memory. In particular, it performs the altering of a V flag and the altering of a D flag, according to a command and address specification from the processor.

<Structure of the Control Unit>

Figure 4:
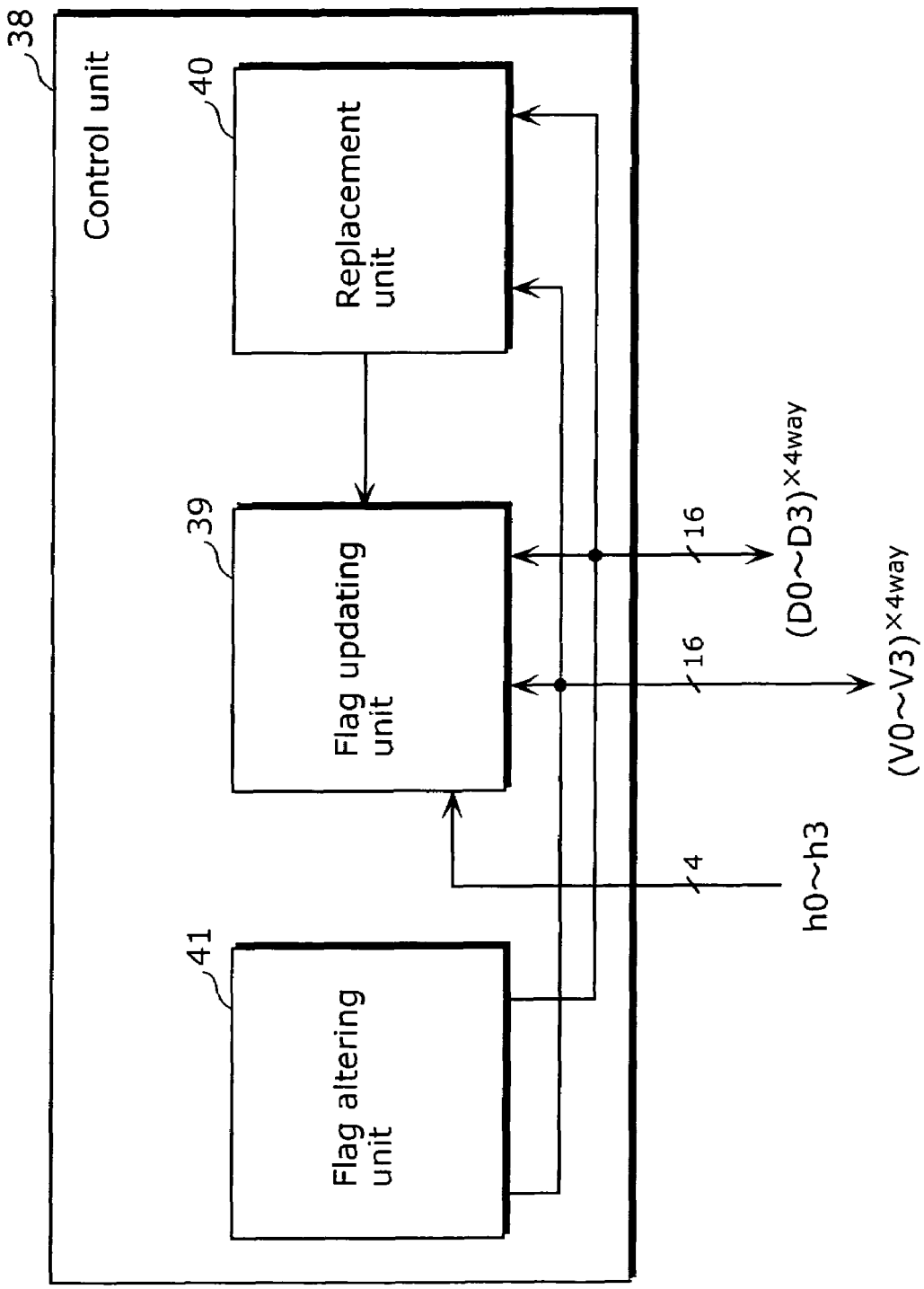
FIG. 4 is a block diagram showing the structure of the control unit.

FIG. 4 is a block diagram showing the structure of the control unit 38. As in the diagram, the control unit 38 includes a flag updating unit 39, a replacement unit 40, and a flag altering unit 41.

The flag updating unit 39 performs V flag and D flag updating so as to reflect the state of the cache memory, in the same manner as in the conventional technology.

The replacement unit 40 performs cache memory replacement in the same manner as in the conventional technology.

The flag altering unit 41 performs V flag altering and D flag altering, depending on a command or address specification from the processor. Such command includes a V flag setting command and a D flag setting command.

<Structure of the Flag Altering Unit>

Figure 5:
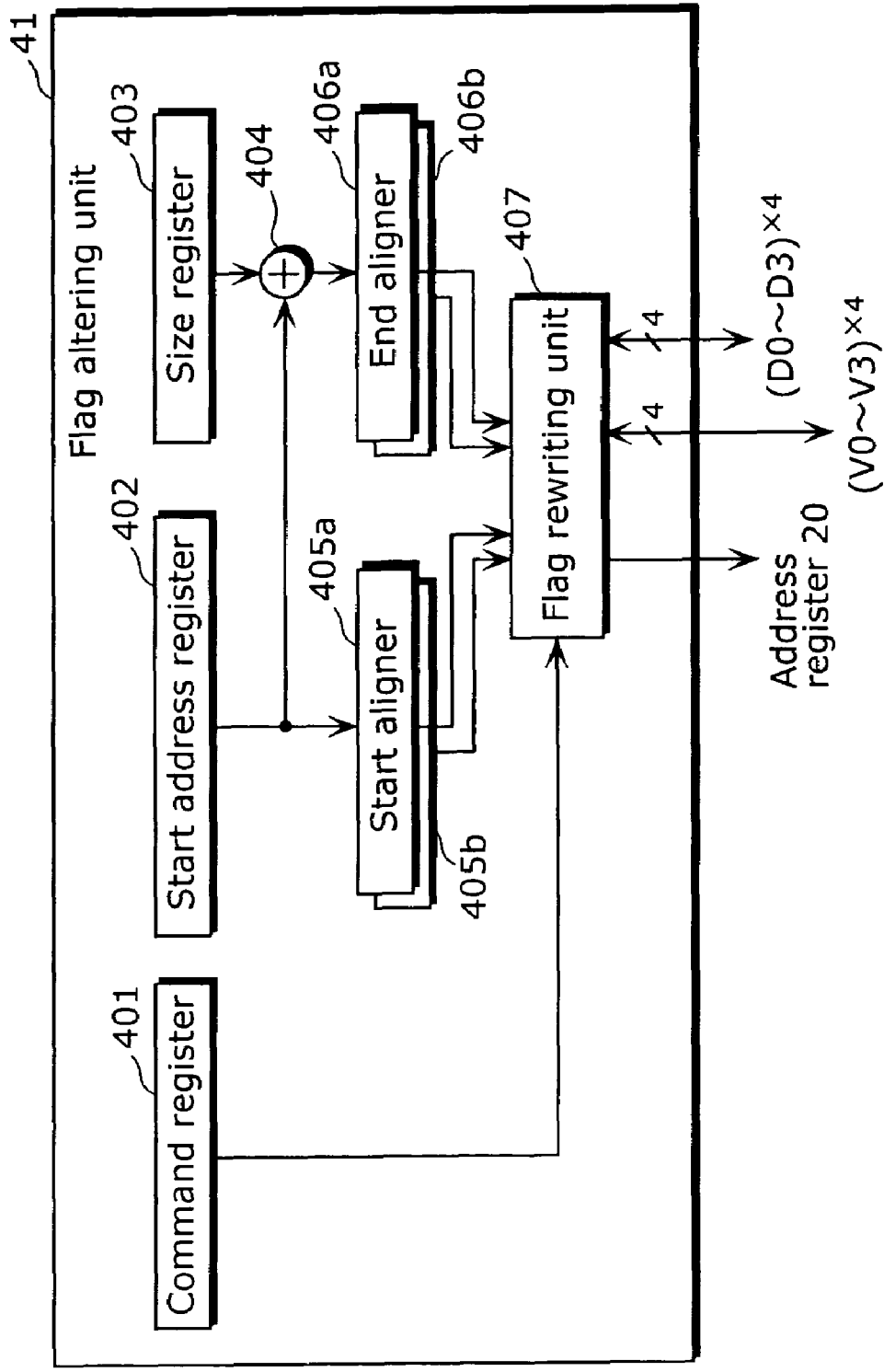
FIG. 5 is a block diagram showing an example of the structure of the flag altering unit.

FIG. 5 is a block diagram showing an example of the structure of the flag altering unit 41. As in the diagram, the flag altering unit 41 includes a command register 401, a start address register 402, a size register 403, an adding unit 404, a start aligners 405a and 405b, end aligners 406a and 406b, and a flag rewriting unit 407.

The command register 401 is a register that allows direct access from the processor 1, and holds a command written by the processor 1. FIG. 6(c) shows an example of an instruction to write a command in the command register 401. This instruction is a normal transfer instruction (mov instruction), and specifies the command as a source operand and the command register (CR) 401 as the destination operand. FIG. 6(d) shows an example of a command format. This command format includes a 2-bit field for a V flag setting command, a 2-bit field for a D flag setting command, and a 4-bit field for a sub-line specification.

For example, the V flag setting command instructs a setting of V=0 when it is "10" (V reset command), instructs a setting of V=1 when it is "11" (V set command), and means invalid when it is "00" (no operation). It is the same for the D flag. The sub-line specification field is a field for individually specifying a sub-line, and is a line (all sub-lines) specification in the case where there is no individual specification.

The start address register 402 is a register which allows direct access from the processor 1, and holds a start address written by the processor 1. This start address indicates the starting position of an address range on which the C flags should be set. FIG. 6(a) shows an example of an instruction for writing a start address into the start address register 402. As in FIG. 6(c), this instruction is also a normal transfer instruction (mov instruction).

The size register 403 is a register which allows direct access from the processor 1, and holds a size which is written by the processor 1. This size indicates an address range starting from the start address. FIG. 6(b) shows an example of an instruction for writing a size into the size register 403. As in FIG. 6(c), this instruction is also a normal transfer instruction (mov instruction). Moreover, the size unit may be a number of bytes or a number of lines (number of cache entries), as long as it is a unit that is fixed in advance.

The adding unit 404 adds the start address held in the start address register 402 and the size held in the size register 403. The result of this addition is an end address indicating an ending position of the address range. The adding unit 404 adds byte addresses when the size is specified as a number of bytes, and adds line addresses when the size is specified as a number of lines.

The start aligners 405a and 405b adjust a start address to the position of a line boundary. The start aligner 405a adjusts in a direction moving towards the end address, and the start aligner 405b adjusts in a direction moving away from the end address. With these adjustments, the processor 1 can specify an arbitrary address as the start address, regardless of the line size and the line boundary.

The end aligners 406a and 406 adjust an end address to the position of a line boundary. The end aligner 406a adjusts in a direction moving towards the start address, and the end aligner 406b adjusts in a direction moving away from the start address. With this adjustment, the processor 1 can specify an arbitrary size for the aforementioned size, regardless of the line size and the line boundaries.

Figure 7:
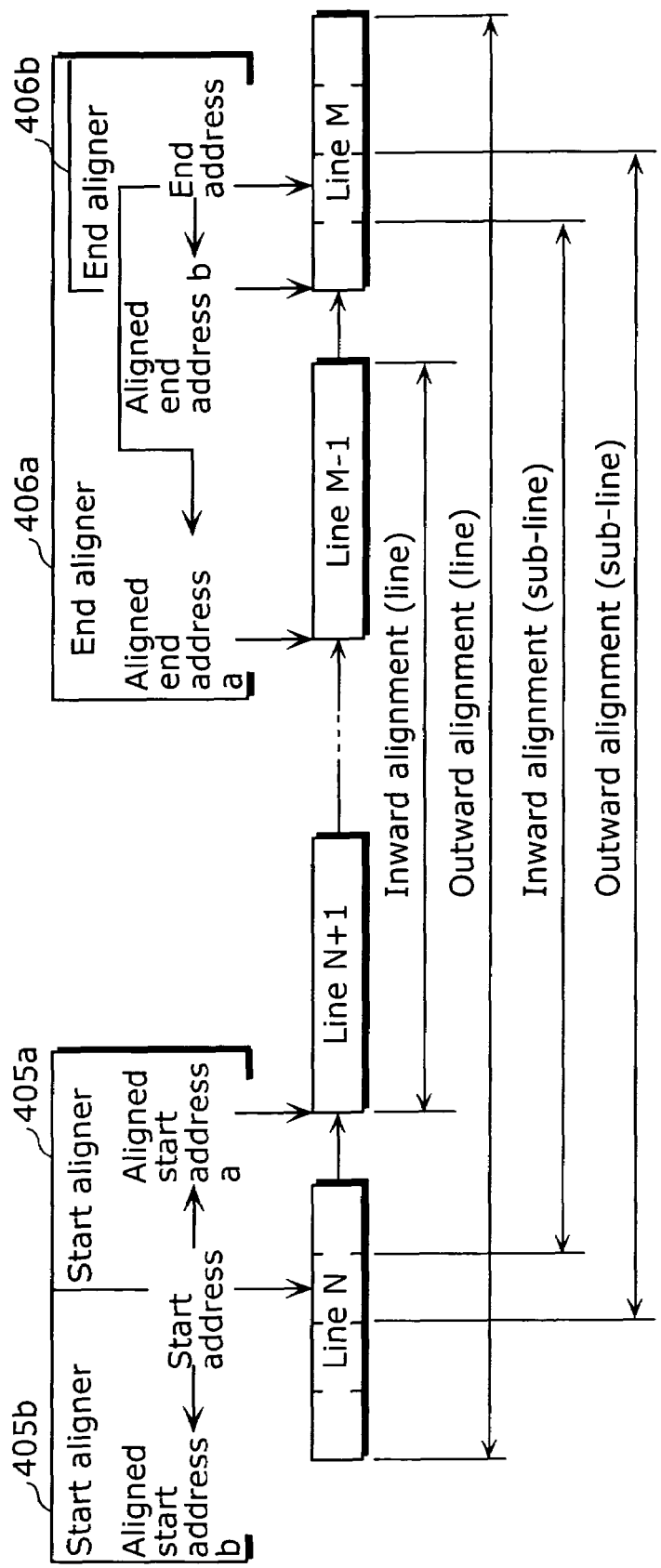
FIG. 7 is an explanatory diagram for the start aligner and the end aligner.

FIG. 7 shows an explanatory diagram for the start aligners 405a and 405b as well as the end aligners 406a and 406b. In the diagram, the start address specified by the processor 1 indicates an arbitrary position midway through a line N. The start aligner 405a makes an adjustment so that the beginning of the next line (N+1) is indicated, and outputs the adjusted address as an aligned start address a. The start aligner 405b makes an adjustment so that the beginning of the line N which includes data of the start address is indicated, and outputs the adjusted address as an aligned start address b. The line indicated by an aligned start address is called a start line.

Furthermore, the end address indicates an arbitrary position midway through a line M. The end aligner 406a makes an adjustment so that the beginning of the immediately preceding line (M−1) is indicated, and outputs the adjusted address as an aligned end address a. The end aligner 406b makes an adjustment so that the beginning of a line M which includes data of the end address is 30 indicated, and outputs the adjusted address as an aligned end address b. A line indicated by the aligned end address is called an end line.

As in the same diagram, the start aligner 405a and the end aligner 406a perform inward alignment on a per line basis. The start aligner 405b and the end aligner 406b perform outward alignment on a per line basis. Furthermore, after outward alignment and inward alignment on a per line basis, further outward alignment and inward alignment on a per sub-line basis is possible.

The flag rewriting unit 407 sets values of V flags or D flags from the start line to the end line, in accordance with a command. At such time, whether the start line and the end line are aligned inward or aligned outward is selected in accordance with the command.

<Flag Altering Process>

Figure 8:
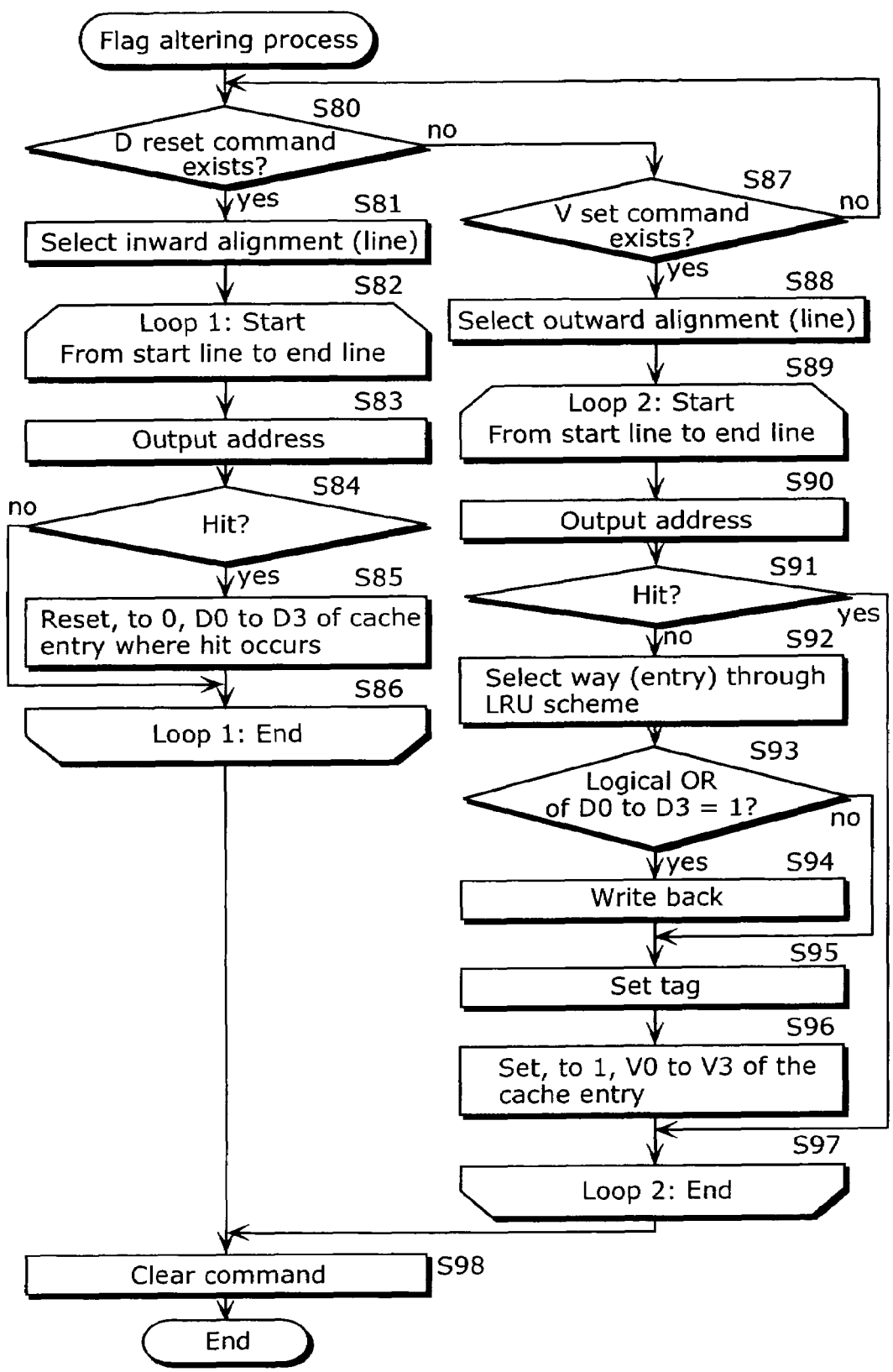
FIG. 8 is a flowchart showing an example of the flag altering process by the flag rewriting unit 407.

FIG. 8 is a flowchart showing an example of the flag altering by the flag rewriting unit 407. In the diagram, a D reset command and a V set command are indicated.

In the diagram, in the case where a D reset command is written in the command register 401 (S80), the flag rewriting unit 407 selects the inward-aligned start line and end line, from among the outputs of the start aligners 405a and 405b as well as the end aligners 406a and 406b (S81). Here, the inward alignment is selected because data outwards of a start address and end address of the line N and line M may not necessarily be discarded by the processor 1.

In addition, the flag rewriting unit 407 performs the process in loop 1 (S82 to S86) while sequentially outputting each line address from the start line to the end line. Here, the process for one line shall be described since the flag rewriting unit 407 performs the same processes on each of the lines.

More specifically, while the cache memory 3 is not accessed by the processor 1, the flag rewriting unit 407 outputs the line addresses to the address register 20 (S83); causes the comparators 32a to 32d to compare the tag address in the address register 20 and the tag of the cache entries; and judges whether or not there is a hit (S84). In addition, in the case of a hit, the flag rewriting unit 407 resets to 0 the D0 to D3 flags of the cache entry where the hit occurred (S85) and, in the case of a mishit, nothing is done since corresponding data is not in the cache memory 3.

In this manner, 0 is set in the D0 to D3 flags of each of the lines from the start line to the end line, in the case where corresponding data is in the cache memory 3. After the end of loop 1, the flag rewriting unit 407 clears the command in the command register 401 (S98). With this, it is possible to prevent an unnecessary write back from a cache entry holding data destined to be discarded such as temporary work data.

Furthermore, in FIG. 8, in the case where a V set command is written in the command register 401 (S87), the flag rewriting unit 407 selects the outward-aligned start line and end line, from among the outputs of the start aligners 405a and 405b as well as the end aligners 406a and 406b (S81). Here, the outward alignment is selected because the size from the start address to the end address cannot be allocated with the inward alignment.

In addition, the flag rewriting unit 407 performs the process in loop 2 (S89 to S97) while sequentially outputting each line address from the start line to the end line. Here, the process for one line shall be described since the flag rewriting unit 407 performs the same processes on each of the lines.

More specifically, while the cache memory 3 is not accessed by the processor 1, the flag rewriting unit 407 outputs the line addresses to the address register 20 (S90); causes the comparators 32a to 32d to compare the tag address in the address register 20 and the tag of the cache entries; and judges whether or not there is a hit (S91). In addition, in the case where a hit does not occur, the flag rewriting unit 407 selects, using the LRU scheme, one way to be replaced, from the four ways within the set corresponding to the line address (S92), and judges whether or not the logical OR of the dirty flags D0 to D3 of the selected way is 1 (S93). In the case where it is judged that the logical OR is 1, in other words, it is dirty, the flag rewriting unit 407 writes back only the dirty sub-line (S94). In the case where it is judged that the abovementioned logical OR is not 1, in other words, it is not dirty, or after writing back the dirty sub-line, the flag rewriting unit 407 sets a line address to the cache entry as a tag, without loading data from the memory to the cache entry (S95), and sets 1 to the valid flags V0 to V3 (S96). In this manner, the cache entry for one line, which does not hold valid data but has had V0 to V3 set as 1, is reserved.

In addition, after the end of loop 1, the flag rewriting unit 407 clears the command in the command register 401 (S98).

With this, a cache entry for the writing of data such as an array can be reserved in the cache memory, as well as prevent an unnecessary write back.

As described thus far, according to the cache memory in the present embodiment, with the D reset command, it is possible to prevent an unnecessary write back from a cache entry holding data destined to be discarded. Furthermore, with the V set command, a cache entry for the writing of data such as an array can be reserved in the cache memory, as well as prevent an unnecessary write back.

Note that although the D reset command and the V set command are described in the aforementioned embodiment, a V reset command can be implemented by deleting step S95 in S87 to S98 shown in FIG. 8, and resetting, to 0, V0 to V3 in step S96. With this, it is possible to prevent an unnecessary write back and release the cache entry.

Furthermore, although the D set command is executable in the same manner as in S80 to S86 in FIG. 8, this is not very practical considering that the D flag is set when data is written according to an instruction from the processor 1, and a write back operation occurs due to the setting of the D flag. However, it can be used in a test operation, performance evaluation, verification, and so on, of the cache memory.

<Variations>

Note that the cache memory in the present invention is not limited to the structure in the aforementioned embodiment, and various types of variations are possible. Hereinafter, a number of variations shall be described.

(1) Although in the abovementioned embodiment, the V0 to V3 flags and D0 to D3 flags are set or reset at the same time, it is also possible to set or reset on a per sub-unit basis.

For example, in the case of processing only the start line and end line on a per sub-line basis, it is possible for the flag rewriting unit 407 to select the outward-aligned (line) start address and end address, and further derive a sub-line address of the start line and a sub-line address of the end line by outward alignment (sub-line) or inward alignment (sub-line), and process only the start line and the end line on a per sub-line basis. Furthermore, the processor 1 can specify such fact in a sub-line specification field inside a command.

For example, in the case where the processor 1 specifies 0 as the size in the size register 403 and specifies a particular sub-line in a sub-line specification field inside a command, it is possible for the flag rewriting unit 407 to carry out processing only on the specified sub-line.

(2) Furthermore, it is also possible to have a structure in which the flag altering unit 41 includes an instruction detection unit which detects the execution of a memory access instruction having a dirty flag resetting directive, and a flag rewriting unit which resets the dirty flag of the cache entry accessed according to the command.

In addition, it is also possible to have a structure in which the instruction detection unit detects the execution of a memory access instruction having a valid flag resetting directive, and the flag rewriting unit resets the valid flag of the cache entry accessed according to the instruction.

(3) Although in the abovementioned embodiment, description is carried out exemplifying a 4-way set-associative cache memory, there may be any number of ways. Furthermore, although in the abovementioned embodiment, an example having 16 as the number of sets is described, it is possible to have any number of sets.

(4) Although in the abovementioned embodiment, description is made exemplifying a set-associative cache memory, it is possible to have a fully associative cache memory.

(5) Although in the abovementioned embodiment, the size of a sub-line is made out to be ¼ of the line size, other sizes such as ½, ⅛, 1/16 and so on, are also possible. In such cases, each cache entry may hold the same number of valid flags and dirty flags as the number of sub-lines.

Second Embodiment

In the first embodiment, the structure which performs V flag altering and D flag altering is described. In the present embodiment, description is made regarding a structure which alters a W (weak) flag in a cache memory having a W flag indicating whether or there will be further usage (write or read).

<Structure of the Cache Memory>

Figure 9:
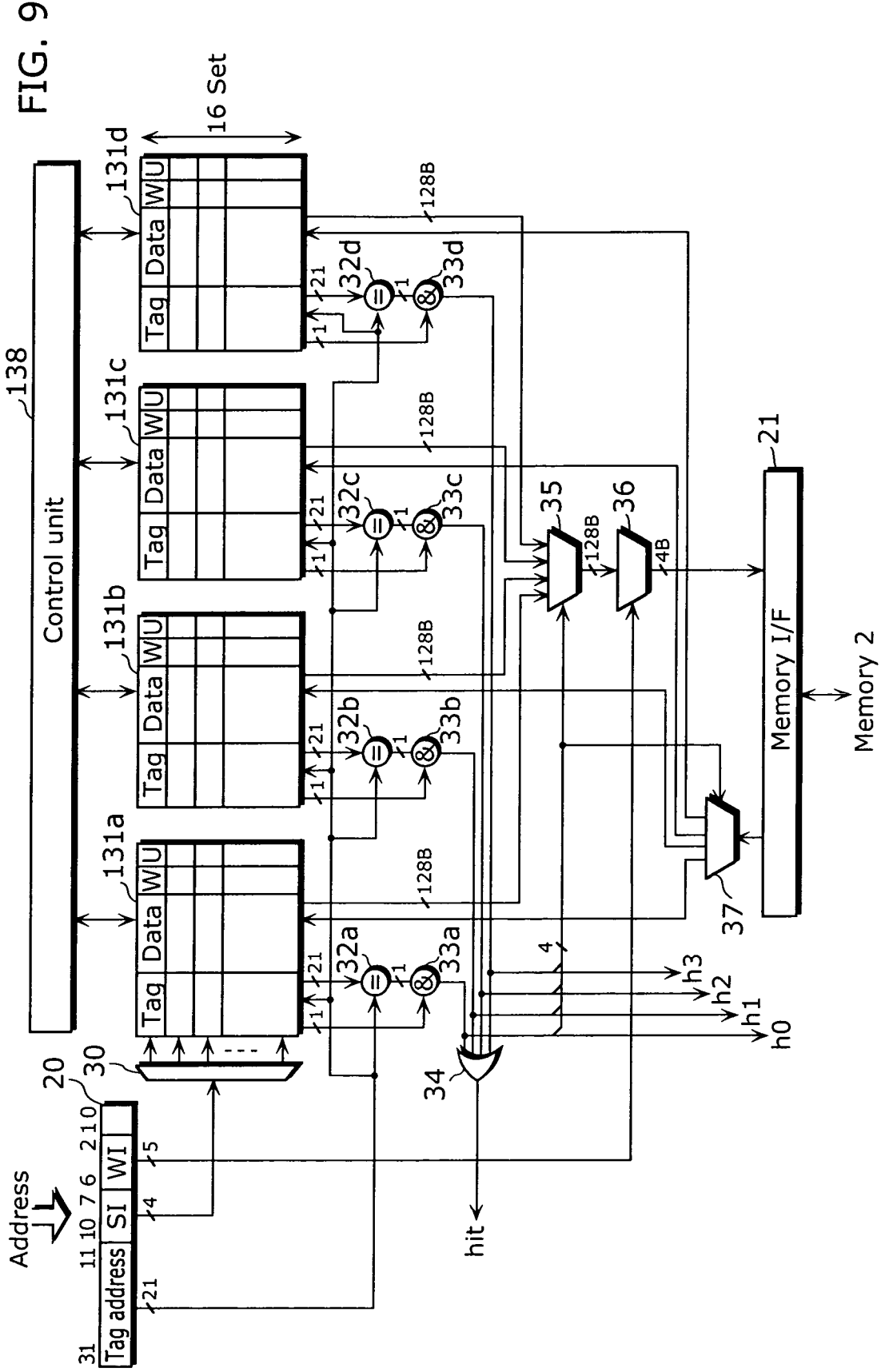
FIG. 9 is a block diagram showing the structure of the cache memory in the second embodiment of the present invention.

FIG. 9 is a block diagram showing the structure of the cache memory in the second embodiment of the present invention. The cache memory in the diagram is different, compared to the structure in FIG. 2, in including ways 131a to 131d in place of the ways 31a to 31d; and in including a control unit 138 in place of the control unit 38. Hereinafter, description shall be focused on the points of difference, while omitting the points which are the same.

The way 131a is different, compared with the way 31a, in having t a W flag and a U flag added in each of the cache entries. The same is true for the ways 131b to 131d.

Figure 10:
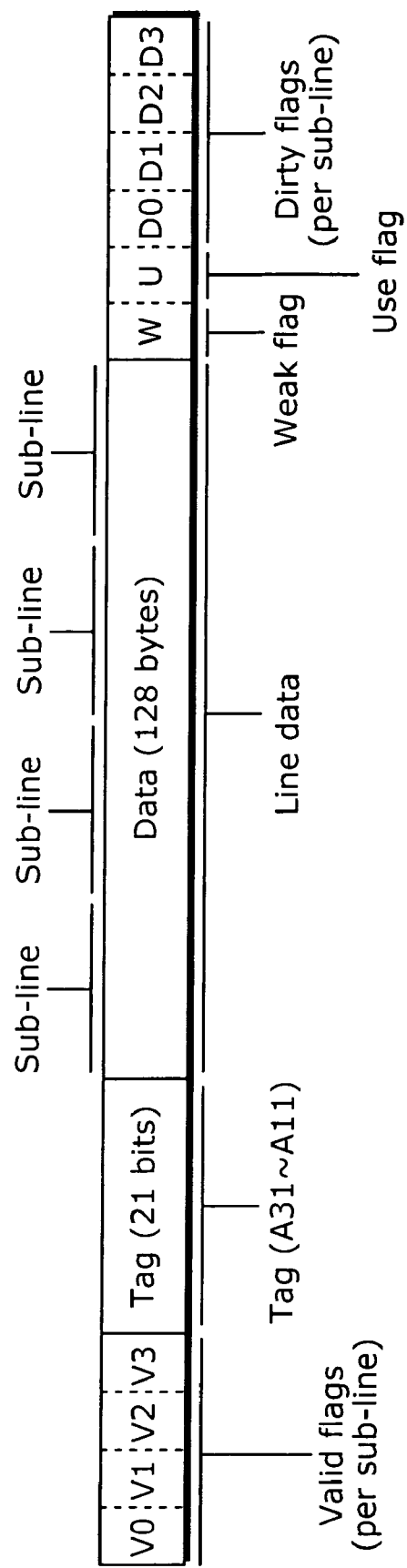
FIG. 10 shows the bit structure of a cache entry.

FIG. 10 shows the bit structure of a cache entry. A cache entry holds valid flags V0 to V3, a 21-bit tag, a 128-byte line data, a week flag W, a use flag U, and dirty flags D0 to D3.

Among these, the weak flag represents whether or not there will be any further usage with regard to access from the processor, and represents, with regard to replacement control in the cache memory, the weakest subject for replacement that can be evicted before other cache entries. In this manner, since the weak flag W has two meanings, it is referred to in the two processes of cleaning and replacement.

The use flag U indicates whether or not there has been an access to the cache entry, and is used, in replacement due to a mishit using the LRU scheme, in place of access order data among the cache entries of the four ways. More accurately, a 1 in the use flag U means an access has been made, and a 0 in the use flag means no access has been made. However, when the use flags of the four ways within a set all become 1, they are reset to 0. Stated differently, the use flag U indicates the two relative states of whether the time of access is old or new. In other words, it means that a cache entry with a use flag as 1 has been accessed more recently than a cache entry having a use flag as 0.

The control unit 138 is different, compared to the control unit 38, in that it sets a W flag, and in that it uses a use flag U in place of the access order information for the LRU scheme.

<Structure of the Control Unit>

Figure 11:
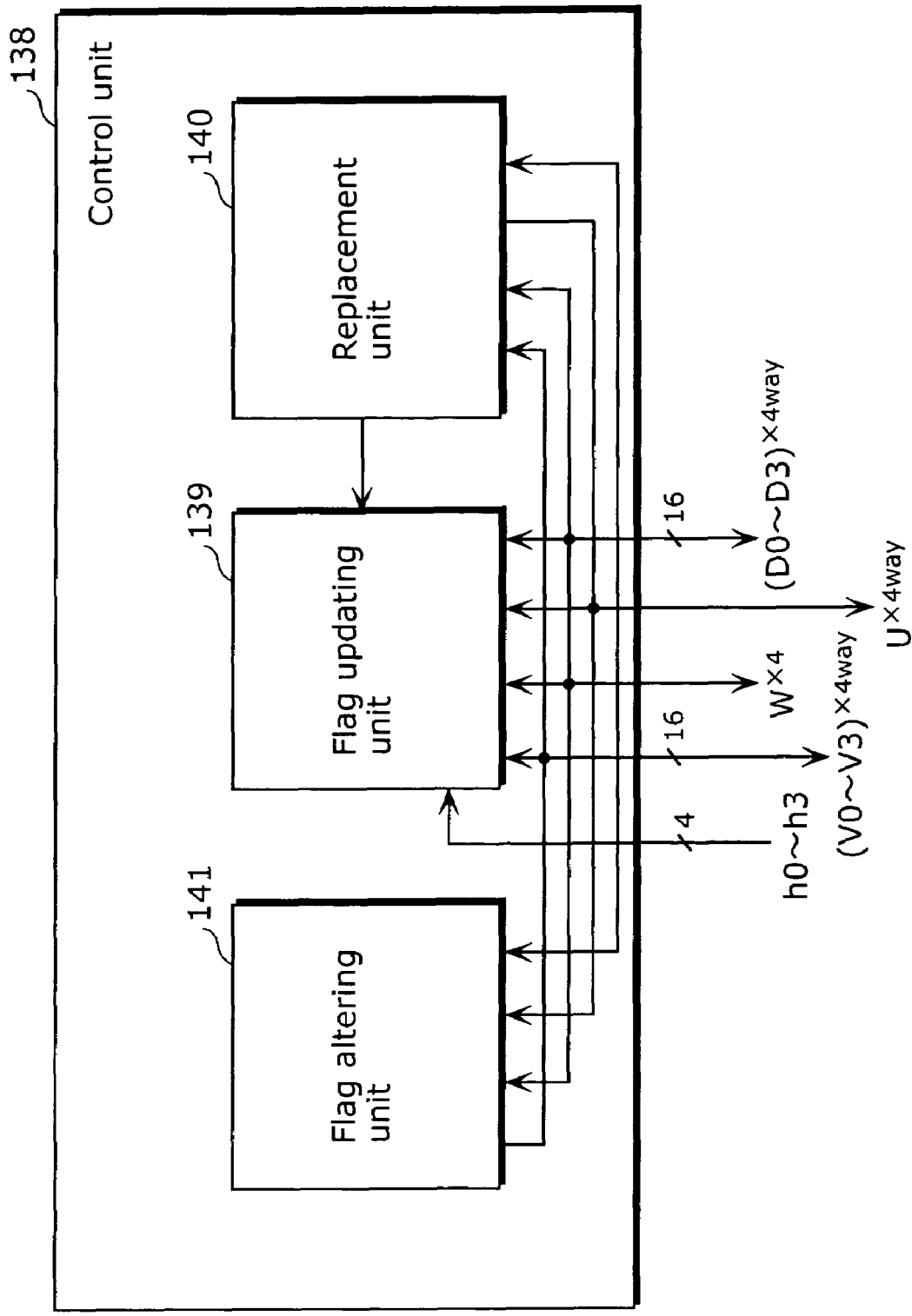
FIG. 11 is a block diagram showing the structure of the control unit.

FIG. 11 is a block diagram showing the structure of the control unit 138. The control unit 138 in the diagram is different, compared to the control unit 38, in including a flag updating unit 139, a replacement unit 140, and a flag altering unit 141 in place of the flag updating unit 39, the replacement unit 40, and the flag altering unit 41 respectively.

The flag updating unit 139 performs updating of the use flag U when the cache memory is accessed, in addition to the updating of the V flag and D flag in the same manner as the flag updating unit 39.

The replacement unit 140 performs replacement according to a pseudo-LRU scheme with the use flag U serving as the access order, instead of the normal LRU scheme. However, in the replacement, a cache entry having W=1 is the very first to be selected as a subject for replacement.

The flag altering unit 141 sets a weak flag W in accordance with a command from the processor 1. The processor 1 issues, to the cache memory 3, a command instructing the setting of a weak flag to a cache entry which will no longer be used (write and read). A cache entry having W=1 is the first subject for replacement, regardless of its use flag U value, when a cache miss occurs. Furthermore, the cache entry having W=1 is a subject for cleaning when dirty.

<Description of the Use Flag U>

Figure 12:
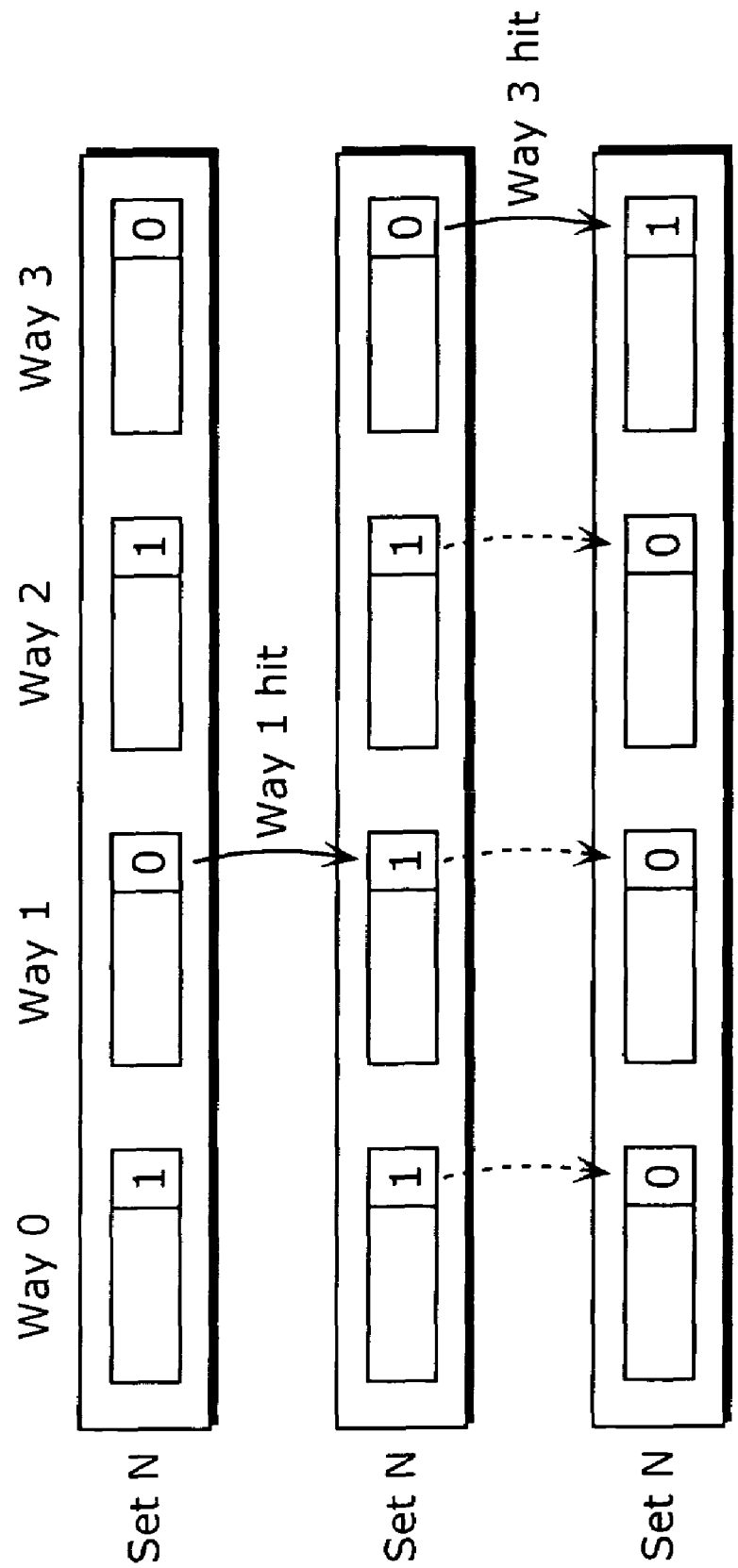
FIG. 12 shows an example of the use flag U updating by the flag updating unit.

FIG. 12 shows an example of use flag U updating by the flag updating unit 39. The upper stage, middle stage, and lower stage in the diagram represent four cache entries making up a set N which straddles the ways 0 to 3. The 1 or 0 at the right end of the four cache entries are respective use flag values. The four use flags U are written as U0 to U3.

In the top stage of the diagram, (U0 to U3)=(1, 0, 1, 0), which means that there was an access to the respective cache entries of the ways 0 and 2, and no access to the respective cache entries of the ways 1 and 3.

In this situation, when a hit occurs in the cache entry of the way 1 within the set N during a memory access, an update (U0 to U3)=(1, 1, 1, 0) is made, as shown in the middle stage in the diagram. More specifically, as shown by the solid line, the use flag U1 of the way 1 is updated from 0 to 1.

In addition, in the situation shown in the middle stage in the diagram, when a hit occurs in the cache entry of the way 3 within the set N during a memory access, an update (U0 to U3)=(0, 0, 0, 1) is made. More specifically, as shown by the solid line, the use flag U1 of the way 3 is updated from 0 to 1. In addition, as shown by the broken lines, the use flags, U0 to U2, other than that for the way 3, are updated from 1 to 0. With this, it means that the cache entry of the way 3 has been accessed more recently than the respective cache entries of the way 0 to 2.

The replacement unit 140 determines, when a cache entry having W=1 does not exist at the time of a cache miss, the cache entry to be the subject for replacement based on the use flags, and performs the replacement. For example, the flag updating unit 39 determines either one of the way 1 and the way 3 to be the subject for replacement in the upper stage in FIG. 5; determines the way 3 as the replacement subject in the middle stage in FIG. 5; and determines any one of the ways 0 to 2 to be the replacement subject in the lower stage in FIG. 5.

<Description of the Weak Flag>

FIG. 13(*a*) is a comparative example for when a weak flag is assumed not to exist, and is a diagram showing the replacement of a cache entry. The diagram also shows, as in FIG. 12, the four cache entries making up the set N which straddles the ways 0 to 3. The 1 or 0 at the right end of the four cache entries are the values of the respective use flags. Furthermore, it is assumed that only data E is seldom accessed data, and data A, B, C, and D are frequently accessed data.

In the situation in the first stage of FIG. 13(*a*), a cache miss occurs when the processor 1 accesses the data E. Due to this cache miss, for example, among cache entries having U=0, the cache entry of the frequently accessed data C is replaced with the seldom accessed data E, and the situation in the second stage is arrived at.

In the situation in the second stage, a cache miss occurs when the processor 1 accesses the data C. Due to this cache miss, the cache entry of the frequently accessed data D, which is a cache entry having U=0, is replaced with the frequently accessed data C, and the situation in the third stage is arrived at.

In the situation in the third stage, a cache miss occurs when the processor 1 accesses the data D. Due to this cache miss, for example, the cache entry of the frequently accessed data C is replaced with the frequently accessed data D, and the situation in the third stage is arrived at.

Likewise in the fourth stage, the seldom used data E is not selected as the subject for replacement, and is left in the cache memory.

In the situation in stage 5, since the seldom used data E is the oldest (U=0), it is selected as the subject for replacement, and is evicted.

In this manner, in the pseudo-LRU scheme (likewise, in the normal LRU scheme), there are cases where, at worst, a cache miss is induced four times when there are four ways, due to the seldom accessed data E.

FIG. 13(*b*) is an explanatory diagram showing the role of the weak flag W in the replacement process.

In the situation in the first stage in FIG. 13(*b*) (same as the first stage in FIG. 13(*a*), a cache miss occurs when the processor 1 accesses the data E. Due to this cache miss, for example, among the cache entries having U=0, the cache entry of the frequently accessed data C is replaced with the seldom accessed data E. At this time, it is assumed that the processor 1 sets a weak flag W as 1 in the cache entry of data E. With this, the cache entry of the data E is the first to be evicted during a cache miss, and the situation in the second stage is arrived at.

In the situation in the second stage, a cache miss occurs when the processor 1 accesses the data C. Due to this cache miss, the cache entry of the seldom accessed data E, which is the cache entry having W=1, is selected as the subject for replacement, and is replaced with the frequently used data C, and the situation in stage 3 is arrived at.

In this manner, by providing a weak flag, it is possible to reduce the inducement of cache misses, due to seldom accessed data.

<U Flag Updating Process>

Figure 14:
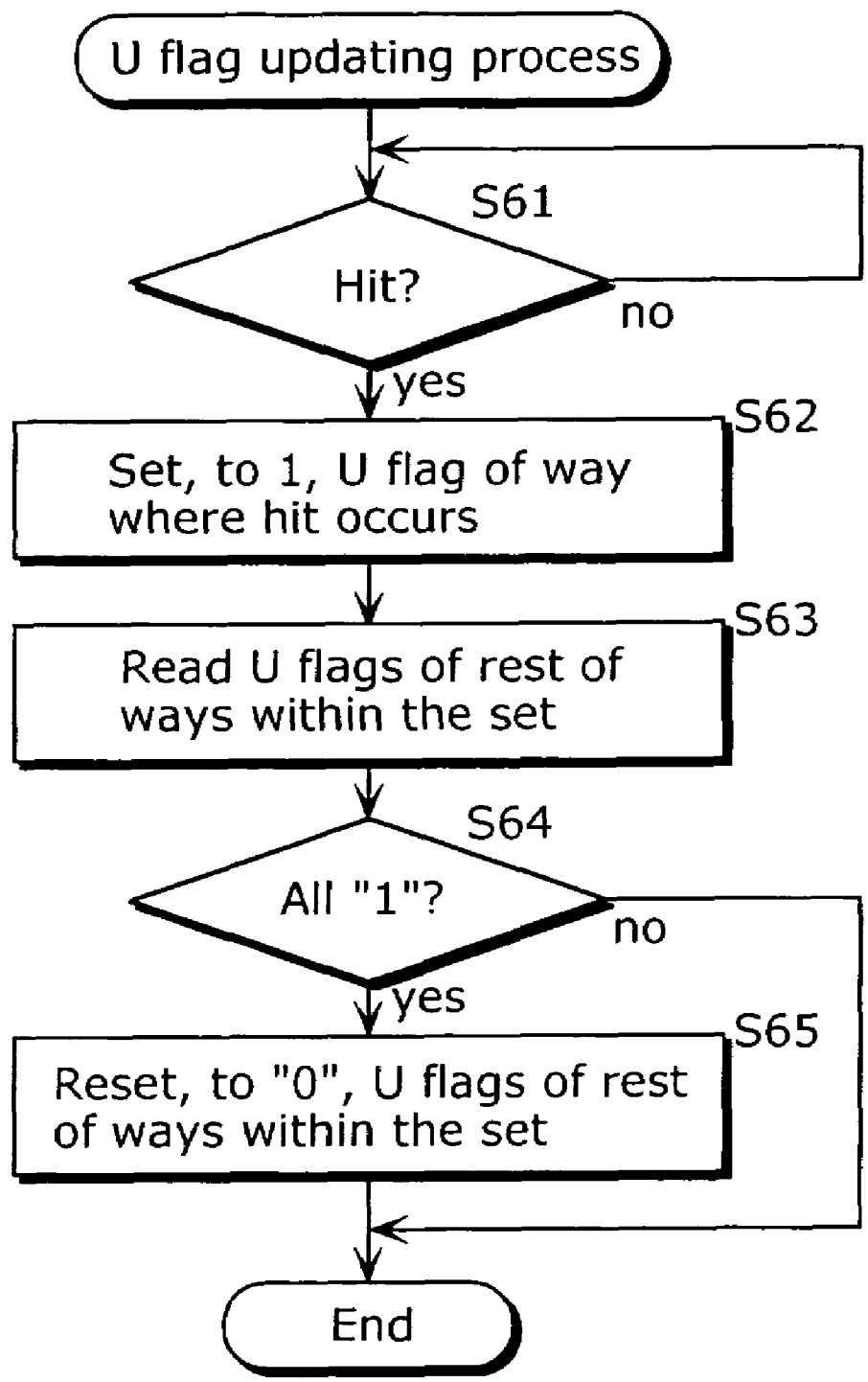
FIG. 14 is a flowchart showing the use U flag updating process by the replacement unit.

FIG. 14 is a flowchart showing the U flag updating by the replacement unit 140. In the diagram, it is assumed that the use flag U of a cache entry having a valid flag as 0 (invalid) is initialized to 0.

In the diagram, when a cache hit occurs (Step S61), the replacement unit 140 sets, to 1, the use flag U of the way, in the set selected according to the set index, in which the hit occurred (Step S62), reads the use flags U of the rest of the ways in such set (Step S63), and judges whether or not the read use flags U all indicate 1 (Step S64). When all do not indicate 1, the process is concluded and, when all indicate 1, all the use flags U of the rest of the ways are reset to 0 (Step S65).

In this manner, the replacement unit 140 updates the use flag U as in the example of updating shown in FIG. 12 and FIG. 13(*a*) and (*b*).

<Replacement Process>

Figure 15:
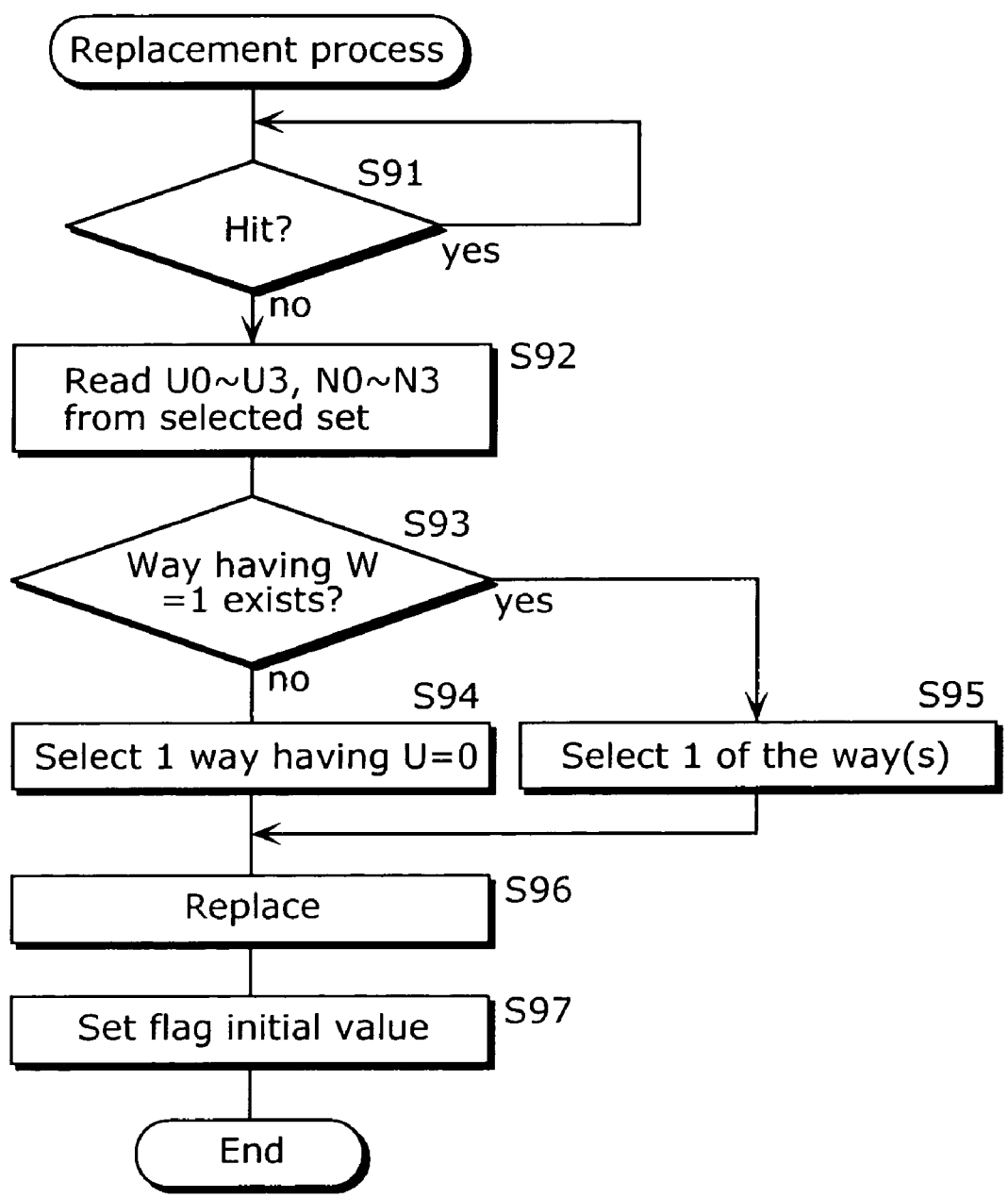
FIG. 15 is a flowchart showing the replacement process by the replacement unit.

FIG. 15 is a flowchart showing the replacement by the replacement unit 140. In the diagram, when a miss occurs in a memory access (Step S91), the replacement unit 140 reads the use flags U and the weak flags W of the four ways in the set selected according to the set index (Step S92), and judges whether or not a way having W=1 exists (Step S93). When it is judged that there is no way having W=1, one way having U=0 is selected (Step S94). At this time, when there is a plurality of ways having use flags as 0, the replacement unit 140 randomly selects one. Furthermore, when it is judged that a way having W=1 exists, one way having W=1 is selected regardless of the U flag value (Step S95). At this time, when there is a plurality of ways having a weak flag W as 1, the replacement unit 140 randomly selects one.

In addition, the replacement unit 140 performs replacement, with the cache entry of the selected way in such set as the subject (Step S96) and, after replacement, initializes the use flag U and the weak flag W of such cache entry to 1 and 0 respectively (Step S97). Moreover, at this time, the valid flag V and the dirty flag D are initialized to 1 and 0 respectively.

In this manner, when a way having W=1 does not exist, one among cache entries having a use flag U as 0, is selected as the subject for replacement.

Furthermore, when a way having W=1 exists, one, among cache entries of ways having W=1, is selected as the subject for replacement, regardless of whether the use flag indicates 0 or 1. With this, it is possible to reduce the inducement of cache misses due to seldom accessed data being left in the cache memory, as shown in FIG. 13(*a*) and (*b*).

<Structure of the Flag Altering Unit 141>

Figure 16:
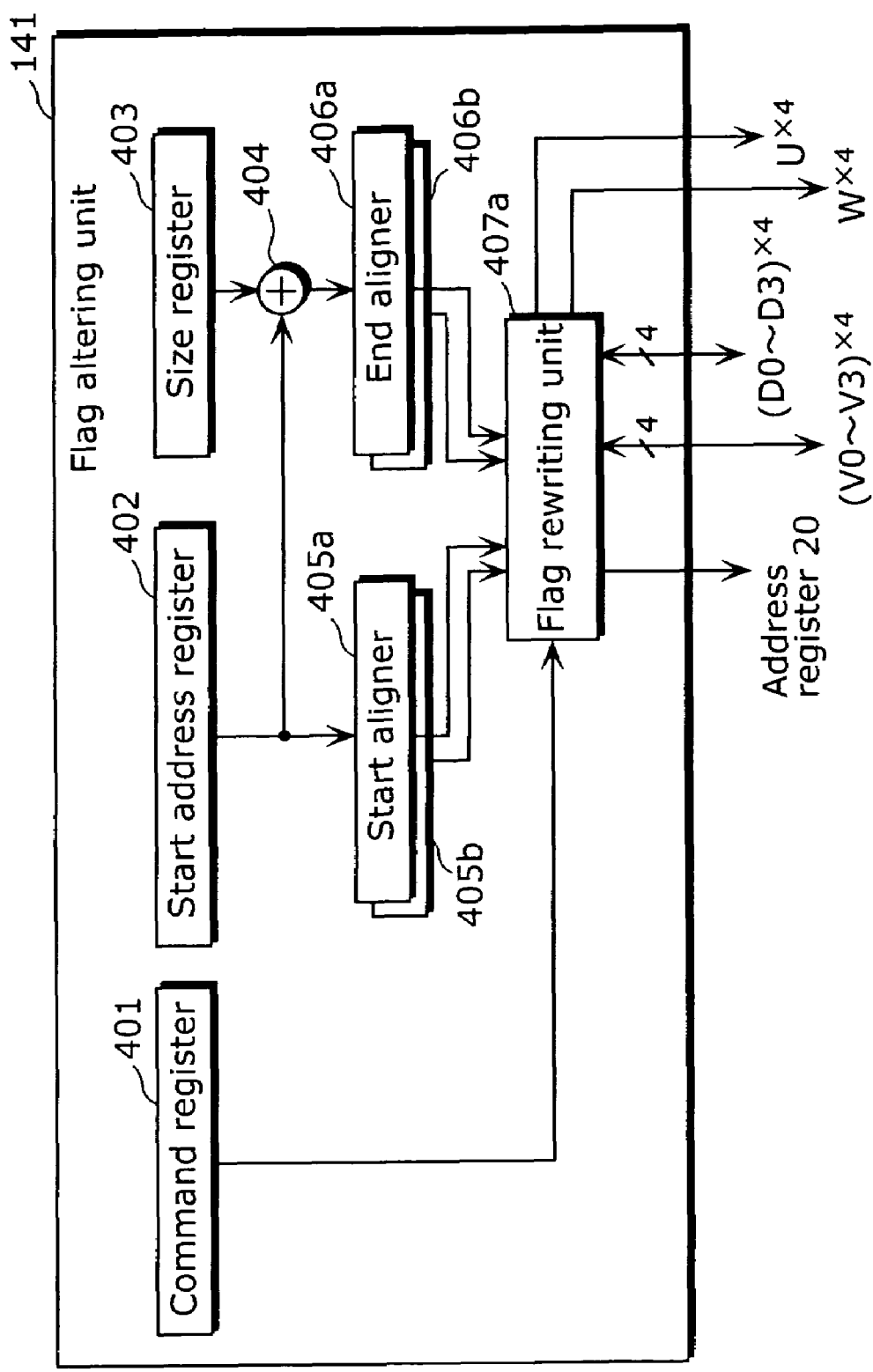
FIG. 16 is a block diagram showing the structure of the flag altering unit.

FIG. 16 is a block diagram showing the structure of the flag altering unit 141. The structure in the diagram is different, compared to the flag altering unit 41 shown in FIG. 5, in including a flag rewriting unit 407*a* instead of the flag rewriting unit 407.

Figure 17:
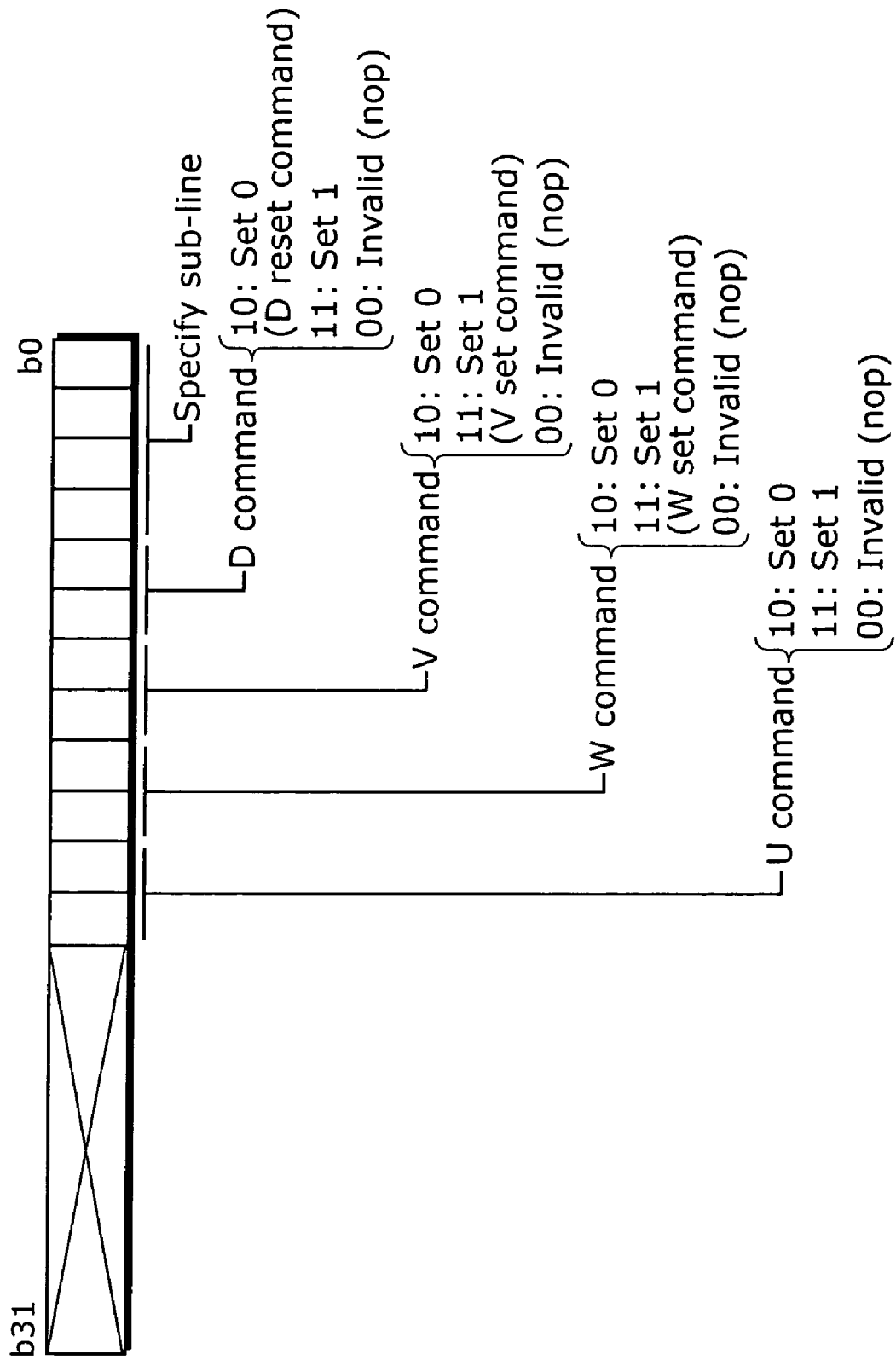
FIG. 17 shows an example of the command format

The flag rewriting unit 407*a* is different in performing W flag altering and use flag U altering, in addition to the functions of the flag rewriting unit 407. As such, a W command which instructs the setting of a W flag, as well as a U command which instructs the setting of a U flag can be set in the command register by the processor 1. FIG. 17 shows examples of the command formats for each of such commands. In the command formats in the diagram, W command and U command fields have been added to the command format shown in FIG. 6(*d*). The contents of a W command and a U command are the same as those of the D command and V command.

<W Flag Setting Process>

Figure 18:
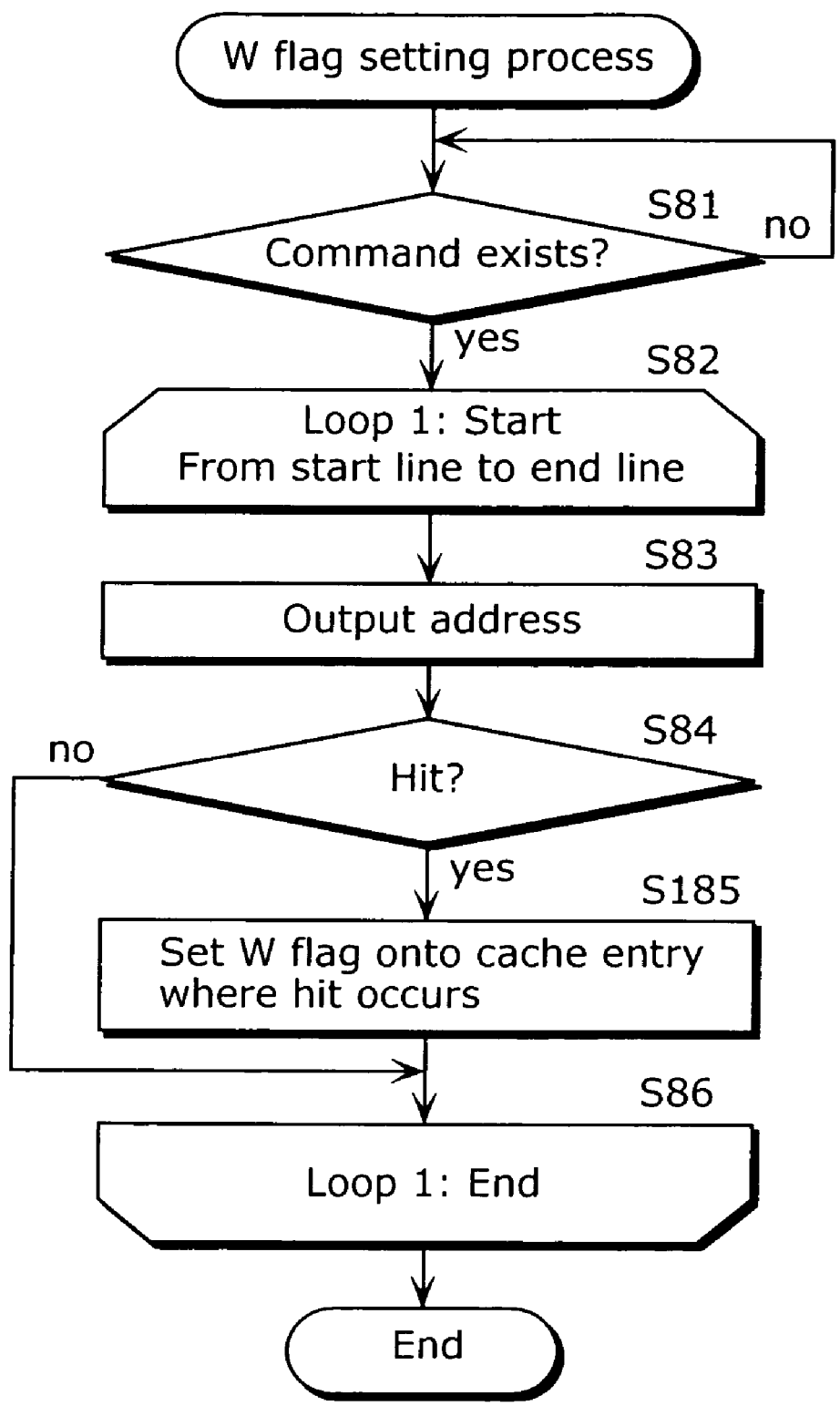
FIG. 18 is a flowchart showing an example of the W flag setting process by the flag rewriting unit.

FIG. 18 is a flowchart showing an example of the W flag setting by the flag rewriting unit 407*a*.

The flag rewriting unit 407*a* performs, when a W flag setting command is held in the command register 401, the process in loop 1 (S82 to S86) while sequentially outputting each line address from the start line to the end line. Here, the process for one line shall be described since the flag rewriting unit 407*a* performs the same processes on each of the lines.

More specifically, while the cache memory 3 is not accessed by the processor 1, the flag rewriting unit 407*a* outputs the line addresses to the address register 20 (S83); causes the comparators 32*a* to 32*d* to compare the tag address in the address register 20 and the tag of the cache entries; and judges whether or not there is a hit (S84). In addition, in the case of a hit, the flag rewriting unit 407*a* sets to 1 the W flag of the cache entry where the hit occurred (S85) and, in the case of a mishit, nothing is done since corresponding data is not in the cache memory 3.

In this manner, 1 is set in the W flag of each of the lines from the start line to the end line, in the case where corresponding data is in the cache memory 3.

<U Flag Setting Process>

The flag rewriting unit 407*a* sets, in the case where a U flag setting command is held in the command register 401, a U flag according to the command. This process is executed in exactly the same manner as the W flag setting, by replacing the expression W flag in FIG. 18 with U flag.

As described thus far, according to the cache memory in the present embodiment, by providing a W flag, it becomes possible to have, as the first subject for replacement, a cache entry having W=1, as it is the oldest cache entry at the time of a cache miss. Furthermore, the value of the use flag U is only 1 bit but it indicates whether an access order is old or new, and therefore, the access order of each line from the start line to the end line can be set through the U flag setting process. For example, the processor 1 specifies an address range corresponding to data that needs to be left in the cache memory 3, and issues a U flag setting command which sets U=1.

As described thus far, according to the cache memory in the present embodiment, by providing a W flag, it becomes possible to have as the first subject for replacement, a cache entry having W=1, as it is the oldest cache entry, at the time of a cache miss. Furthermore, the value of the use flag U is only 1 bit but it indicates whether an access order is old or new, and therefore, the access order of each line from the start line to the end line can be set through the U flag setting process. For example, it is possible for the processor 1 to specify an address range corresponding to data that needs to be left in the cache memory 3, and issue a U flag setting command which sets U=1. Conversely, it is possible to specify, as an address range, data that may be evicted from the cache memory 3, and issue a U flag setting command which sets U=0.

<Variations>

(1) Although a cache entry having W=1 is the first subject for replacement, it is also possible for the control unit to perform cleaning (write back) when the entry is dirty, during the period up to replacement.

(2) It is also possible for the respective commands shown in FIG. 6(*a*), (*b*) and (*c*) to be inserted within a program, by a compiler. At that time, the compiler may insert the aforementioned respective instructions in a position in the program which will not be performed of further write operations such as the writing of array data, the writing of block data during the decoding of compressed video data, and the like.

INDUSTRIAL APPLICABILITY

The present invention is suitable as a cache memory for facilitating high-speed memory access, and is suitable, for example, as an on-chip cache memory, an off-chip cache memory, a data cache memory, an instruction cache memory, and the like.

The invention claimed is:
1. A cache memory, comprising:
a flag holding unit which holds, in a correspondence with a cache entry that holds a data unit of caching, a valid flag indicating whether or not the cache entry is valid, and a dirty flag indicating whether or not the cache entry has been written into;

a command holding unit which is configured of a register that allows access from a processor by a data transfer instruction, and holds a command issued by the processor by a data transfer instruction; and an altering unit operable to alter, based on a command held by said command holding unit, at least one of the valid flag and the dirty flag, contrary to the state of the cache entry, wherein the command to said command holding unit is issued by a data transfer instruction, the command being data transferred by the data transfer instruction, said altering unit operating independently of an operation of the processor, and performs the altering while the cache memory is not accessed by the processor.

2. The cache memory of claim 1, wherein said altering unit further includes:

an instruction detection unit operable to detect execution of a memory access instruction having a dirty flag reset directive; and a flag rewriting unit operable to reset a dirty flag of a cache entry which is accessed according to the instruction.

3. The cache memory of claim 1, wherein said altering unit further includes:

an instruction detection unit operable to detect execution of a memory access instruction having a valid flag reset directive; and a flag rewriting unit operable to reset a valid flag of a cache entry which is accessed according to the instruction.

4. The cache memory of claim 1, wherein said command holding unit includes a first field that specifies an operation to the valid flag, and a second field that specifies an operation to the dirty flag.

5. The cache memory of claim 1, wherein said altering unit is operable to set, in the cache entry, an address serving as a tag, and to set the valid flag, without loading data from a memory.

6. The cache memory claim of claim 5, wherein said altering unit is operable to reset the dirty flag of the cache entry in a state in which the cache entry holds rewritten data that has not been written back.

7. The cache memory of claim 5, further comprising:

a holding unit which holds an address range specified by the processor; and an identification unit operable to identifiy a cache entry which holds data belonging to the held address range, wherein said altering unit is operable to alter at least one of the valid flag and the dirty flag of the identified cache entry.

8. The cache memory of claim 7, wherein said identification unit includes:

a first conversion unit operable, in the case where a start address of the address range indicates a point midway through line data, to convert the start address into a start line address indicating a start line included in the address range;

a second conversion unit operable, in the case where an end address of the address range indicates a point midway through the line data, to convert the end address into an end line address indicating an end line included in the address range; and a judgment unit operable to judge whether or not there exist cache entries which hold data corresponding to respective line addresses from the start line address to the end line address.

9. The cache memory of claim 6, further comprising:

a holding unit which holds an address range specified by the processor; and an identification unit operable to identify a cache entry which holds data belonging to the held address range, wherein said altering unit is operable to alter at least one of the valid flag and the dirty flag of the identified cache entry.

10. The cache memory of claim 9, wherein said identification unit includes:

a first conversion unit operable, in the case where a start address of the address range indicates a point midway through line data, to convert the start address into a start line address indicating a start line included in the address range;

a second conversion unit operable, in the case where an end address of the address range indicates a point midway through the line data, to convert the end address into an end line address indicating an end line included in the address range; and a judgment unit operable to judge whether or not there exist cache entries which hold data corresponding to respective line addresses from the start line address to the end line address.

11. A method for controlling a cache memory having, in a correspondence with a cache entry which holds a data unit of caching, a valid flag indicating whether or not the cache entry is valid, and a dirty flag indicating whether or not the cache entry has been written into, the cache entry holding a data unit of caching, the method comprising:

causing a predetermined register to hold a command issued by a processor, the processor executing a data transfer instruction that transfers data as the command to the predetermined register;

setting, in the cache entry, an address serving as a tag, and setting the valid flag, without loading data from a memory, based on a held command; and resetting, based on a held command, the dirty flag of the cache entry in a state in which the cache entry holds rewritten data that has not been written back, wherein setting the valid flag and resetting the dirty flag are performed independently of an operation of the processor, and are performed while the cache memory is not accessed by the processor.

* * * * *